United States Patent Office 3,249,536
Patented May 3, 1966

3,249,536
SELECTIVE ACIDIZING
Loyd W. Jones, Tulsa, Okla., assignor to Pan American Petroleum Corporation, Tulsa, Okla., a corporation of Delaware
No Drawing. Filed Dec. 26, 1962, Ser. No. 247,375
2 Claims. (Cl. 252—8.55)

This invention relates to acidizing oil-bearing formations penetrated by wells. More particularly it relates to an acidizing method in which the oil-bearing portions of the formation are acidized more effectively than the water-bearing portions.

In acidizing oil-bearing formations, aqueous hydrochloric acid solutions have been used with great success for many years. In spite of their successful use, however, hydrochloric acid solutions have a few inherent disadvantages. For example, the solutions, being aqueous, tend to flow into the water-filled pores and zones of the formation in preference to the oil-filled pores and zones. The result is that water production may be increased more than oil production. This, of course, is a very undesirable condition.

Another disadvantage of aqueous hydrochloric acid solutions in acidizing wells is the extremely active nature of the acid. It is substantially completely neutralized before it can be injected very far back into the formation. The result is that unnecessarily large channels are formed near the well while substantially no channels are formed at greater distances from the well.

An object of this invention is to provide a method for acidizing an oil-bearing formation penetrated by a well in which method the oil-bearing pores and zones are acidized to a greater degree than the water-bearing zones and pores. Another object is to provide an acidizing method which produces enlarged channels in an oil-bearing formation to a distance of several feet from a well bore penetrating the formation. Still other objects will be apparent from the following description and claims.

In general, I accomplish the objects of my invention by injecting into the formation a substantially neutral aqueous solution of hypochlorous acid. A substantially neutral solution is possible due to the low degree of ionization of this acid. Since the solution is substantially neutral, it cannot react with the formation in the water-bearing pores and zones. When the hypochlorous acid comes in contact with crude oil, however, the oil is oxidized, reducing the hypochlorous acid to hydrochloric acid. The hydrochloric acid then reacts readily with calcareous materials in the formation.

It is true that the aqueous solution enters the water-bearing pores and zones more readily than the oil-bearing zones and pores. In my process, however, this is an advantage. In most formations, the flow channels intersect frequently. Thus, a water-bearing pore frequently intersects oil-bearing pores. If a hypochlorous acid solution flows through a water-filled pore, therefore, it eventually reaches oil-filled pores where reaction between the oil and acid can take place to liberate hydrochloric acid. In flowing through the water-filled pores, however, the hypochlorous acid solution by-passes many of the oil-bearing pores and penetrates far back into the formation before contacting oil to generate the active hydrochloric acid. For this reason, acidizing of the formation to a considerable distance from the well takes place.

In the laboratory a hypochlorous acid soutlion (HOCl) was prepared by bubbling gaseous chlorine through a sodium hypochlorite solution until the solution became colorless and a pH of 6.0 was reached. Upon standing for 48 hours the pH dropped to 3.8 and the solution became yellowish green in color. Excess calcium carbonate was added and the solution was filtered. The pH of the resulting neutralized solution was 5.7. A 50 milliliter portion of this neutralized solution was stirred with 20 milliliters of oil while heating to a temperature of 180° F. over a period of 15 minutes. The solution was then allowed to cool. When the solution reached a temperature of about 105° F. the pH was measured. It was found to be about 1.2. The solution readily dissolved limestone.

When 50 milliliters of the neutralized hypochlorous acid solution was stirred and heated alone to 180° F. and then cooled as described above, the pH was 5.4 and the solution had little, if any, effect on limestone.

Certain precautions must be carefully observed due to the rather unstable nature of hypochlorous acid. If the concentration is too high or the temperature is elevated, hypochlorous acid can decompose into chloric acid and hydrochloric acid. The chloric acid is highly ionized. In fact, it is as strong an acid as hydrochloric acid. It will be apparent, then, that a substantially neutral solution of chloric acid is not possible. For these reasons the hypochlorous acid solution should not be stronger than about 30 percent by weight and should preferably be about 10 or 15 percent by weight. The temperature should not greatly exceed 100° F. for long periods of time before use of the acid. The hypochlorous acid concentration should be at least about 5 percent by weight if it is to provide a substantial increase in permeability of the formation.

Another difficulty is that the decomposition of hypochlorous acid into chloric and hydrochloric acids is greatly accelerated by a low pH. Thus, a pH above about 4, and preferably between about 5 and about 6, should be maintained. This can be easily done by maintaining a little limestone in contact with the hypochlorous acid. The hypochlorous acid itself will not react with the limestone, but any chloric or hydrochloric acid will. This avoids the development of an acid condition which would accelerate decomposition of the hypochlorous acid.

An upper pH limit of about 8 also exists. The reason for this is that in order to reach a pH of more than about 8, most of the hypochlorous acid must be converted to a salt such as sodium hypochlorite. Reduction of sodium hypochlorite by crude oil produces sodium chloride rather than the desired hydrochloric acid.

For the above reasons it will be apparent that it is necessary to maintain the pH of the hypochlorous acid solution within a range between about 4 and about 8. Preferably, the pH should be between about 5 and about 6.

Some crude oils may not react at a sufficiently high rate with hypochlorous acid to provide an acidizing action at the desired location. That is, the hypochlorous acid may flow too far away from the well before it is converted into hydrochloric acid. In such cases, it may be desirable to inject a more reactive oil ahead of or following the hypochlorous acid solution. It is also possible to inject a less reactive oil to which has been added an easily oxidizable organic compound such as furfural or osme other oil-soluble aldehyde. It will also be apparent that if the naturally occurring oil in the formation is too reactive, a less reactive oil can be injected ahead of the hypochlorous acid solution.

Since the hypochlorous acid is unstable, it should be prepared no more than a few days before us. Preferably, it should be prepared immediately before use. The preparation can take place at a central acidizing station, the hypochlorous acid then being transported in a tank truck to the well to be treated. Preferably, the preparation of the acid should be carried out at the well. The simplest method is ordinarily to bubble chlorine gas into a sodium hydroxide solution. The chlorine reacts with water to form hypochlorous and hydrochloric acid which are neutralized by the sodium hydroxide to form sodium hypochlorite and sodium chloride, respectively. The pH should be checked periodically or preferably continuously. When the pH reaches a value of about 9, all the NaOH has been converted to NAOCl and NACl. Further addition of chlorine then results in the HCl liberating HOCl from the NaOCl. When the pH reaches a value of about 5, substantially all of the NaOCl has been converted into HOCl. Further addition of chlorine results in the presence of free HCl in the solution with a corresponding drop of pH below 4. As previously noted, HOCl decomposes rather rapidly under acid conditions so a pH below 4 should be avoided.

The reaction can take place in a tank or tank truck. Since the presence of iron also catalyzes the decomposition of HOCl, the tank should be preferably be lined with plastic, glass, or some other inert material. If the HOCl is to be used immediately, however, an ordinary steel tank may sometimes be used.

Another way of preparing the hypochlorous acid is to dissolve a known weight of chlorine in water and then allow the resulting solution to flow over limestone to neutralize the HCl. This method should be used principally for preparing dilute solutions because of the high pressures required to cause solution of a high concentration of chlorine in the water and because high concentrations of calcium chloride may catalyze decomposition of HOCl.

Still another precaution which is ordinarily inherently taken, but which should be mentioned is the light sensitivity of HOCl. The containers for the manufacture, storage, and transportation of the acid should, therefore, be opaque. Transparent or even translucent glass or plastic should not be used, particularly if they are exposed to direct sun light. As previously noted, however, glass-lined or plastic-lined steel tanks are the preferred containers for the acid.

One other factor should be considered. This is corrosion. The substantially neutral hypochlorous acid solution does not, of course, cause acid corrosion. It must be realized, however, that the acid is a fairly strong oxidizing agent. It can cause rather severe oxygen corrosion of steel at high temperatures. Therefore, the usual precautions against oxygen corrosion, such as the use of oxygen corrosion inhibitors, should be taken. If glass-lined or plastic-lined equipment is used to avoid decomposition of the HOCl, these same linings protect the containers against corrosion. It may be advisable to protect well equipment by injecting the acid down plastic tubing or plastic-lined steel tubing.

The volumes of acid used and injection techniques are those ordinarily used in acidizing jobs, except as noted above. The process is usually applied to oil-producing wells, but it may also be applied to other types of wells. The process is particularly applicable to injection wells in waterflooding processes. Since the acid is a strong oxidizing agent, it attacks and decomposes organic material such as bacteria colonies which may be plugging the face of the formation. In attacking organic matter, hydrochloric acid is released which dissolves inorganic substances such as scale, rust, or the like.

As the hypochlorous acid flows on back into the formation, it comes into contact with residual crude oil. This oil, to some extent, decreases the permeability of the formation to the flow of injected water. Reaction of the hypochlorous acid with the oil produces acids which reduce the interfacial tension between the oil and water. This may aid in decreasing the oil saturation in the zone immediately around the well. Hydrochloric acid released by reaction of hypochlorous acid with the crude oil dissolves calcareous portions of the formation. This also aids in increasing the permeability of the formation around the injection well to the flow of injected water. As in the case of oil-producing wells, the action of the hypochlorous acid is substantially confined to the oil-bearing zones so the tendency of the flooding water to by-pass the oil by flowing through water-filled zones is not increased.

My invention will be better understood from the following example employing my process. A well 2,500 feet deep penetrates an oil-bearing formation from about 2,400 to about 2,450 feet. Bottom hole pressure is about 300 pounds per square inch gauge. The tubing is pulled from the well and is replaced with a plastic-lined steel tubing extending to 2,350 feet. A packer is set between the tubing and casing at the bottom of the tubing. A glass-lined tank truck of 1,500 gallons capacity is partly filled with 1,200 gallons of an aqueous solution containing 10 percent by weight of sodium hydroxide. A sparger tube, made by perforating plastic tubing with small holes, is placed in the bottom of the tank truck and is connected to a group of chlorine cylinders manifolded together. The chlorine cylinders are placed on large scales so that loss in weight will provide a rough idea of the amount of chlorine introduced into the caustic solution. Chlorine is then permitted to bubble up through the caustic solution. A small plastic pump circulates acid out of the bottom of the tank and back into the top to provide a stirring action in addition to that produced by the bubbling chlorine.

After about 1,500 pounds of chlorine have been introduced, bubbling of chlorine is stopped and the pH of a sample of the reaction solution is taken. Additional chlorine is then introduced about 100 pounds at a time until at about 1,900 pounds the pH of the solution drops to about 5.2, indicating that the NaOCl in solution has been converted substantially entirely to HOCl. The tank containing the hypochlorous acid is then connected to the plastic-lined tubing in the well and the HOCl solution is permitted to run into the well. The hydraulic head of the acid solution is sufficient to cause the acid to penetrate the formation. When all the acid has been injected, a volume of water approximately equal to the internal volume of the tubing is introduced into the tubing to be sure all the acid is washed out of the tubing. The plastic-lined tubing is then removed from the well, the regular well tubing is run, and the well is returned to service.

Applications and modifications of my invention in addition to those described above, and falling within the scope of the following claims, will be apparent to those skilled in the art.

I claim:

1. A process for acidizing an oil-bearing calcareous formation penetrated by a well comprising injecting through said well and into said formation an aqueous solution having a pH between about 4 and about 8 and containing from about 5 to about 30 percent by weight of hypochlorous acid, and separately injecting into said formation an oil solution of an oil-soluble reducing agent capable of reacting with said hypochlorous acid to produce hydrochloric acid.

2. A process for acidizing an oil-bearing calcareous formation penetrated by a well comprising injecting through said well and into said formation an aqueous solution having a pH between about 5 and about 6 and containing from about 10 to about 15 percent of hypochlorous acid, and separately injecting into said formation an oil solution of an oil-soluble reducing agent capable of reacting with hypochlorous acid to produce hydrochloric acid.

References Cited by the Examiner

UNITED STATES PATENTS

| | | | |
|---|---|---|---|
| 2,059,459 | 11/1936 | Hund | 252—8.55 |
| 2,863,832 | 12/1958 | Perrine | 252—8.55 |
| 2,885,004 | 5/1959 | Perry | 252—8.55 |
| 3,122,503 | 2/1964 | Katzer | 252—8.55 |

OTHER REFERENCES

Partington, Inorganic Chemistry, pub. 1926, Macmillan and Co., Limited of London, pages 374 and 375.

Holleman et al., Inorganic Chemistry, Seventh Edition, pub. 1927 by John Wiley and Sons, Inc., of London, pages 86 and 87.

ALBERT T. MEYERS, *Primary Examiner.*

JULIUS GREENWALD, *Examiner*

H. B. GUYNN, *Assistant Examiner.*